(12) United States Patent
Burd et al.

(10) Patent No.: US 11,633,936 B2
(45) Date of Patent: Apr. 25, 2023

(54) AIRCRAFT MONUMENT COMPOSITE CONSTRUCTION USING CARBON UNI-DIRECTIONAL SPREAD FLAT TOW WOVEN FABRIC

(71) Applicant: B/E Aerospace, Inc., Winston-Salem, NC (US)

(72) Inventors: Peter J. L. Burd, Burry Port (GB); Venkata Prasanth Suman Neti, Milton Keynes (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 190 days.

(21) Appl. No.: 16/401,440

(22) Filed: May 2, 2019

(65) Prior Publication Data

US 2020/0346429 A1    Nov. 5, 2020

(51) Int. Cl.
| | |
|---|---|
| *B32B 5/02* | (2006.01) |
| *B32B 5/24* | (2006.01) |
| *B32B 5/26* | (2006.01) |
| *B64D 11/04* | (2006.01) |
| *B64D 11/00* | (2006.01) |
| *B32B 3/12* | (2006.01) |

(52) U.S. Cl.
CPC ............... *B32B 5/024* (2013.01); *B32B 3/12* (2013.01); *B32B 5/245* (2013.01); *B32B 5/26* (2013.01); *B64D 11/04* (2013.01); *B32B 2262/106* (2013.01); *B32B 2605/18* (2013.01); *B64D 2011/0046* (2013.01)

(58) Field of Classification Search
CPC ....................... B64D 11/04; B64D 2011/0046
USPC ........................................................ 244/118.5
See application file for complete search history.

(56) References Cited

U.S. PATENT DOCUMENTS

| | | | |
|---|---|---|---|
| 5,667,866 A | 9/1997 | Reese, Jr. | |
| 6,074,722 A * | 6/2000 | Cuccias | B64B 1/00 |
| | | | 428/113 |

(Continued)

FOREIGN PATENT DOCUMENTS

| | | | |
|---|---|---|---|
| WO | WO-0075410 A1 * | 12/2000 | ............ D06C 29/00 |
| WO | WO-2012040564 A2 * | 3/2012 | ........... A47B 96/025 |

(Continued)

OTHER PUBLICATIONS

Extended Search Report in European Application No. 19212633.2 dated Jun. 26, 2020, 8 pages.

*Primary Examiner* — Nicholas McFall
*Assistant Examiner* — Marisa V Conlon
(74) *Attorney, Agent, or Firm* — Suiter Swantz pc llo

(57) ABSTRACT

A construction of commercial aircraft interior monument employs carbon fiber Spread Tow Fabric (STF) as face sheets (skins) surrounding a paper honeycomb or foam core to produce flat pressed panels of high strength and desirable thickness. Each individual panel is joined with other panels to construct a modular rectangular cubic able to be modularly coupled with additional structures to form the aircraft monument. The use individual STF panels offer a desirable weight and footprint of a fabricated structure as a whole. Also usable in conjunction with other composite reinforcements, the individual STF panels produce hybrid lay-ups for both pressed flat panel and tooled composite moldings offering a high strength to weight ratio of the overall monument.

14 Claims, 17 Drawing Sheets

(56) References Cited

U.S. PATENT DOCUMENTS

| | | | | |
|---|---|---|---|---|
| 9,038,945 B2* | 5/2015 | Godecker | B64D 11/0007 | 244/118.5 |
| 10,322,530 B2* | 6/2019 | Kawabe | B29C 43/30 | |
| 2009/0072086 A1* | 3/2009 | Smith | B32B 3/12 | 244/119 |
| 2009/0314889 A1* | 12/2009 | Baatz | B64D 11/04 | 244/118.5 |
| 2012/0085862 A1* | 4/2012 | Pangalila | B64D 11/04 | 244/118.5 |
| 2013/0047657 A1* | 2/2013 | Oswald | B64D 13/06 | 62/407 |
| 2013/0256249 A1* | 10/2013 | Burd | B64D 11/0015 | 211/153 |
| 2013/0260662 A1* | 10/2013 | Burd | B62B 3/003 | 454/143 |
| 2013/0269384 A1* | 10/2013 | Burd | B64D 13/08 | 62/285 |
| 2015/0059384 A1* | 3/2015 | Burd | B64D 11/04 | 62/239 |
| 2015/0059385 A1* | 3/2015 | Burd | F25D 15/00 | 62/239 |
| 2015/0151842 A1* | 6/2015 | Weixler | B64D 11/04 | 454/76 |
| 2016/0114892 A1* | 4/2016 | Moran | B64D 11/0007 | 244/118.5 |
| 2016/0361889 A1* | 12/2016 | Bartolome | B32B 5/145 | |
| 2018/0044023 A1* | 2/2018 | Nojiri | B64D 11/04 | |
| 2018/0135212 A1* | 5/2018 | Johanson | D03D 15/46 | |
| 2019/0210729 A1* | 7/2019 | Riedel | B64D 11/0015 | |
| 2019/0375508 A1* | 12/2019 | Schalla | B64D 13/08 | |
| 2020/0115057 A1* | 4/2020 | Chylinski | B64D 13/08 | |

FOREIGN PATENT DOCUMENTS

| | | |
|---|---|---|
| WO | 2013147594 A1 | 10/2013 |
| WO | 2013149143 A1 | 10/2013 |

\* cited by examiner

AIRCRAFT MONUMENT COMPOSITE CONSTRUCTION USING CARBON UNI-DIRECTIONAL SPREAD FLAT TOW WOVEN FABRIC

BACKGROUND

Traditional aircraft monument construction may include the use of heavy conventional aerospace standard glass fiber composite reinforcements. These thick panels may increase galley footprint as well as decrease available area for passengers and crew.

Similarly, traditional panels may possess limited tensile properties consistent with conventional aerospace standard glass fiber products. This limitation may decrease available monument size and structure. Further, a traditional honeycomb cored panel may possess a single dimensional strength in a direction following the ribbon core while possessing a limited strength in a transverse direction.

Therefore, a need remains for a composite construction which may overcome these limitations and provide a novel commercial aircraft interior monument encompassing carbon unidirectional spread flat tow woven fabric.

SUMMARY

In one aspect, embodiments of the inventive concepts disclosed herein are directed to a composite aircraft cabin monument construction. The construction including a lower modular rectangular cuboid comprising a lower left side panel, the lower left side panel constructed of a composite panel structure. The composite panel structure constructed of parallel carbon fiber spread tow fabric (STF) face sheets surrounding an inner core sheet. The lower modular rectangular cuboid further comprising a lower right side panel, a lower back panel, and a lower top panel, each of the lower right side, back and top panels constructed of the composite panel structure.

For support, the lower modular rectangular cuboid may further comprise a lower frame encircling one of the lower back panel and the lower top panel, the lower frame configured for joining each of the lower left and lower right side panels to one of the lower back and the lower top panels.

In addition to the lower cuboid, the monument may include an upper modular rectangular cuboid comprising an upper left side panel, an upper right side panel, an upper base panel, an upper back panel, and an upper top panel, each panel of the upper modular rectangular cuboid constructed of the composite panel structure.

Similarly, for support of the upper panels, the upper modular rectangular cuboid may also include an upper frame encircling one of the upper base panel and the upper back panel, the upper frame configured for joining each of the upper left and upper right side panels to one of the upper back and the upper base panels.

To construct the monument, the upper modular rectangular cuboid may be configured to couple with the lower modular rectangular cuboid, the base of the upper modular rectangular cuboid coupling with the top of the lower modular rectangular cuboid.

In a further aspect a method for aircraft monument construction may comprise fabricating an aircraft monument, the aircraft monument comprised of a composite panel structure constructed of parallel carbon fiber STF face sheets surrounding an inner core sheet. The aircraft monument including a lower modular rectangular cuboid comprising a plurality of lower panels, each panel of the plurality of lower panels constructed of the composite panel structure. Also, the aircraft monument may include an upper modular rectangular cuboid comprising a plurality of upper panels, each panel of the plurality of upper panels constructed of the composite panel structure. The upper modular rectangular cuboid configured to couple with the lower modular rectangular cuboid. The method may include coupling the lower modular rectangular cuboid with at least one of the upper modular rectangular cuboid.

A further embodiment of the inventive concepts disclosed herein may include a composite aircraft galley. The composite aircraft galley may include a plurality of panels constructed of a composite panel structure, the composite panel structure constructed of parallel carbon fiber STF face sheets surrounding an inner core sheet. The composite aircraft galley may include a lower modular rectangular cuboid comprising a plurality of lower panels, each panel of the plurality of lower panels constructed of the composite panel structure. The composite aircraft galley may also include an upper modular rectangular cuboid comprising a plurality of upper panels, each panel of the plurality of upper panels constructed of the composite panel structure. Here, the upper modular rectangular cuboid may be configured to couple with at least one of: a second upper rectangular cuboid and the lower modular rectangular cuboid. Further, the composite aircraft galley may be configured for infusing at least one of the upper modular rectangular cuboid and lower modular rectangular cuboid with a conditioned air.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
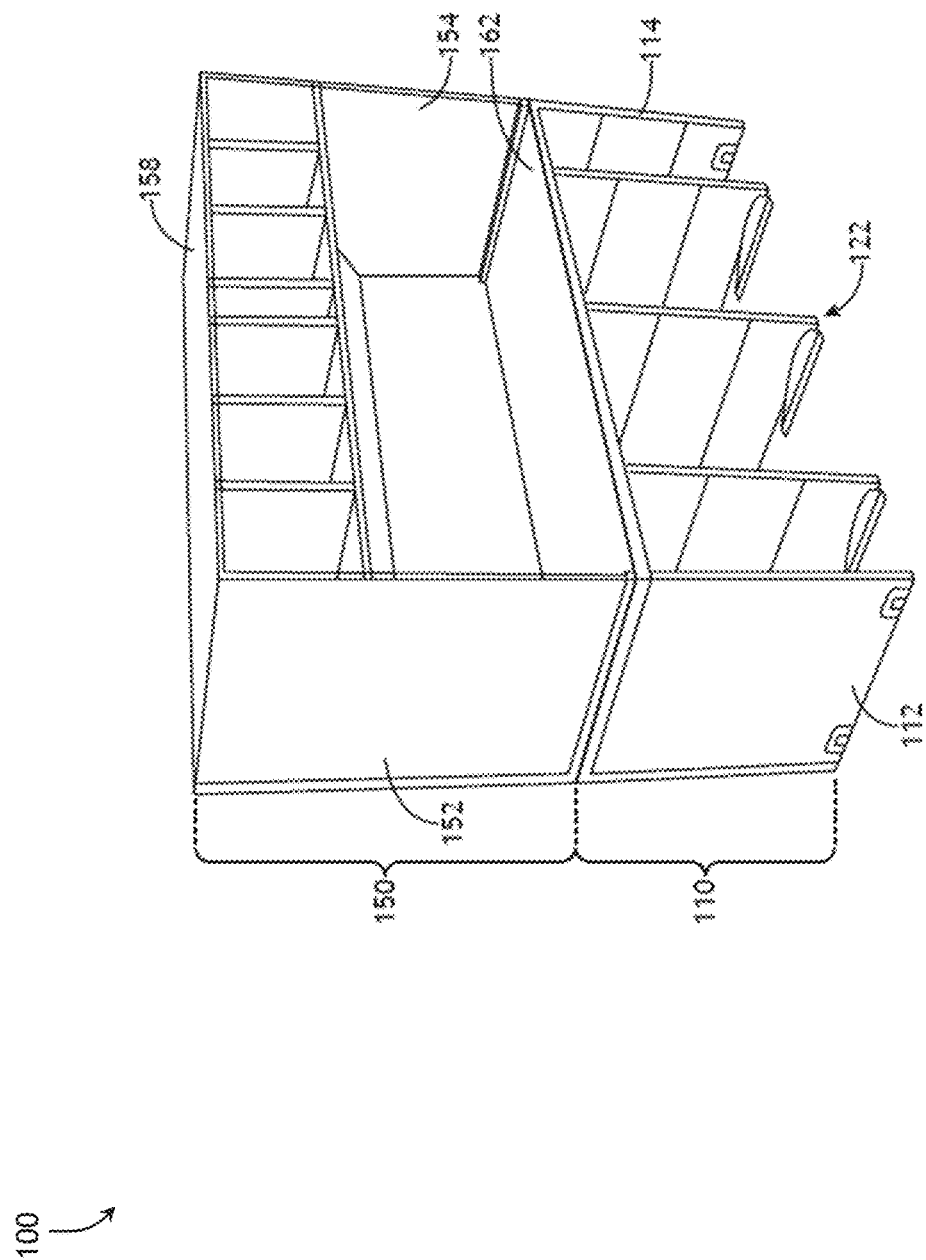
FIG. 1 is a diagram of an assembled aircraft monument in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a construction of commercial aircraft interior monument employs carbon fiber Spread Tow Fabric (STF) as face sheets (skins) surrounding a paper honeycomb or foam core to produce flat pressed panels of high strength and desirable thickness. Each individual panel is joined with other panels to construct a modular rectangular cubic able to be modularly coupled with additional structures to form the aircraft monument. The use individual STF panels offer a desirable weight and footprint of a fabricated structure as a whole. Also usable in conjunction with other composite reinforcements, the individual STF panels produce hybrid lay-ups for both pressed flat panel and tooled composite moldings offering a high strength to weight ratio of the overall monument

| Reference Chart | |
|---|---|
| 100 | Assembled Aircraft Monument |
| 202 | First STF Face Sheet |
| 204 | Second STF Face Sheet |
| 110 | Lower Modular Rectangular Cuboid |
| 112 | Lower Left Side Panel |
| 114 | Lower Right Side Panel |
| 116 | Lower Back Panel |
| 118 | Lower Top Panel |
| 120 | Lower Frame |
| 122 | Lower Cart Dividers |
| 150 | Upper Modular Rectangular Cuboid |
| 152 | Upper Left Side Panel |
| 154 | Upper Right Side Panel |
| 156 | Upper Back Panel |
| 158 | Upper Top Panel |
| 160 | Upper Frame |
| 162 | Upper Base Panel |
| 200 | Composite Panel Structure |
| 202 | Horizontal Carbon Fiber Tape |
| 204 | Vertical Carbon Fiber Tape |
| 206 | Angled Carbon Fiber Tape |
| 208 | Opposite Carbon Fiber Tape |
| 210 | Inner Core Sheet |
| 212 | Ribbon Core Direction |
| 220 | 45/45 STF Sheet |
| 230 | 0/90 STF Sheet |
| 236 | Heavy 0/90 STF Sheet |
| 240 | Adhesive Film |
| 250 | Composite Panel Type 2 |
| 252 | Composite Panel Type 1 |
| 300 | Lower Cuboid Construction |
| 320 | Lower Top Air Pathway |
| 322 | Lower Back Air Pathway |
| 400 | Upper Cuboid Construction |
| 410 | Air Supply Duct |
| 412 | Insulated Dividers |
| 420 | Air Return Duct |
| 422 | Anti-resonance Island |
| 424 | Variable Galley Inserts |
| 430 | Siamese Air Port |
| 432 | Siamese Supply Port |
| 434 | Siamese Return Port |
| 436 | Mechanical Connection |
| 440 | Air Return Ports |
| 442 | Air Supply Port |
| 452 | Edge Joint |
| 454 | Upper Dividers |
| 456 | Upper Closeout Panel |
| 458 | Services Panel |
| 500 | Upper and Lower Assembly View |
| 600 | Method |
| 602 | Fabricating a Monument |
| 604 | Coupling Lower and Upper |

FIG. 1 Assembly

Referring now to FIG. 1, a diagram of an assembled aircraft monument in accordance with an embodiment of the inventive concepts disclosed herein is shown. The assembled aircraft monument 100 may include a lower modular rectangular cuboid 110 and an upper modular rectangular cuboid 150. Each cuboid may be comprised of a plurality of composite panels creating each individual structure and together, the overall assembled aircraft monument 100.

Figure 3A:
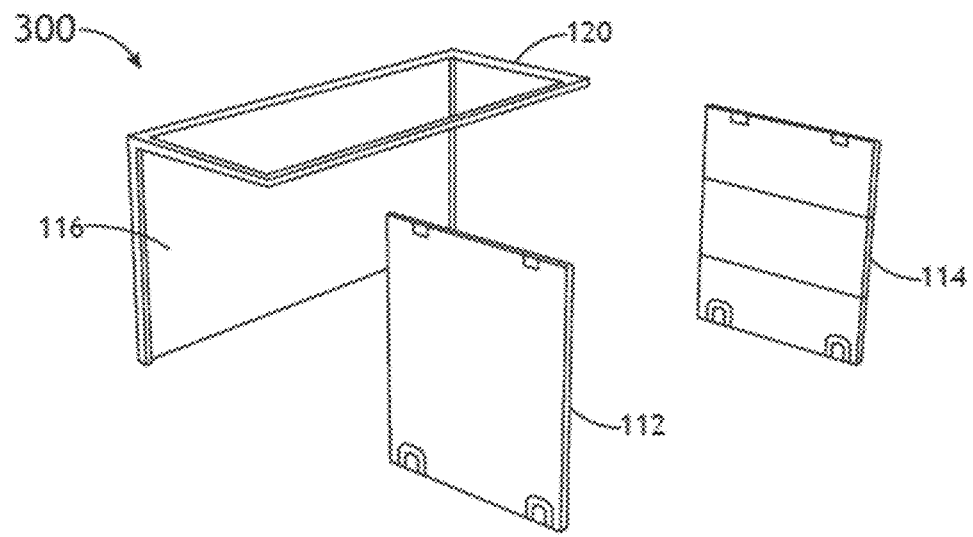
FIGS. 3A-3E are diagrams of an exemplary lower modular rectangular cuboid construction in accordance with an embodiment of the inventive concepts disclosed herein.
Figure 3B:
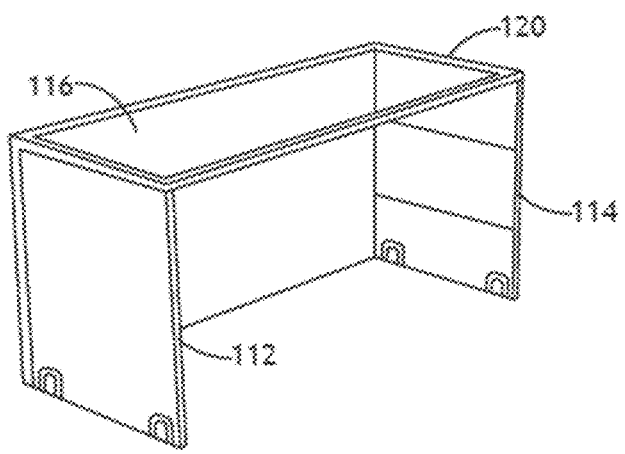
Figure 3C:
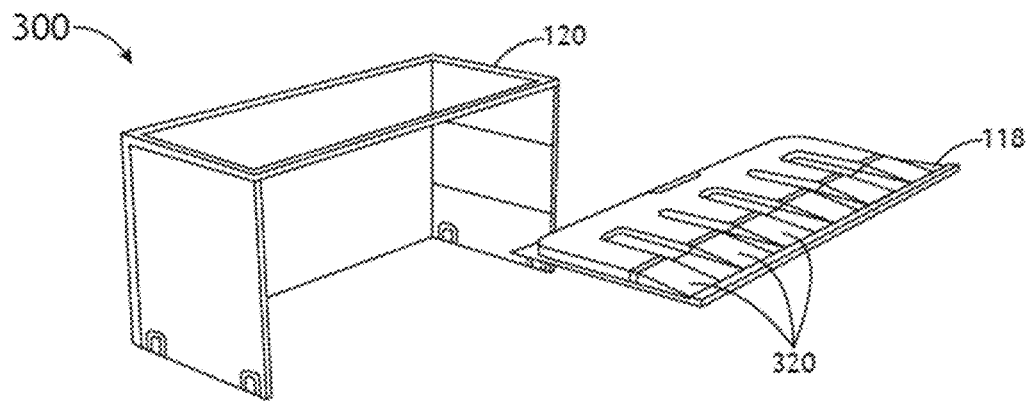

The lower modular rectangular cuboid 110 may be comprised of a plurality of panels including a lower left side panel 112, a lower right side panel 114, a lower back panel 116 (seen best in FIG. 3A), and a lower top panel 118 (seen best in FIG. 3C). The upper modular rectangular cuboid 150 may include an upper left side panel 152, an upper right side panel 154, an upper back panel 156 (seen best in FIG. 4C), an upper top panel 158, and an upper base panel 162.

To enhance organization of the lower modular rectangular cuboid 110, a plurality of lower cart compartment dividers 122 may function to separate the lower modular rectangular cuboid 110 allowing organized storage. In one embodiment of the inventive concepts disclosed herein, the cart compartment dividers 122 may be pre molded and bonded into preinstalled (cold bonded) composite sections. In one optional construction method, the compartment dividers 122 may be bonded to the galley prior to coupling the upper and lower modular rectangular cuboids together.

FIGS. 2A-2I Composite Panel Structure

Referring now to FIGS. 2A through 2E, diagrams of parallel carbon fiber spread tow fabric (STF) face sheets with interwoven carbon fiber tape in accordance with an embodiment of the inventive concepts disclosed herein are shown. A composite panel structure 200 may include a plurality of parallel panels fused together. This approach of fusing multiple this panels together to form a composite panel structure 200 may result in a high strength to weight ratio with the tensile strength available in multiple directions based on, inter alia, the weave of the individual elements comprising the composite panel.

Figure 2B:
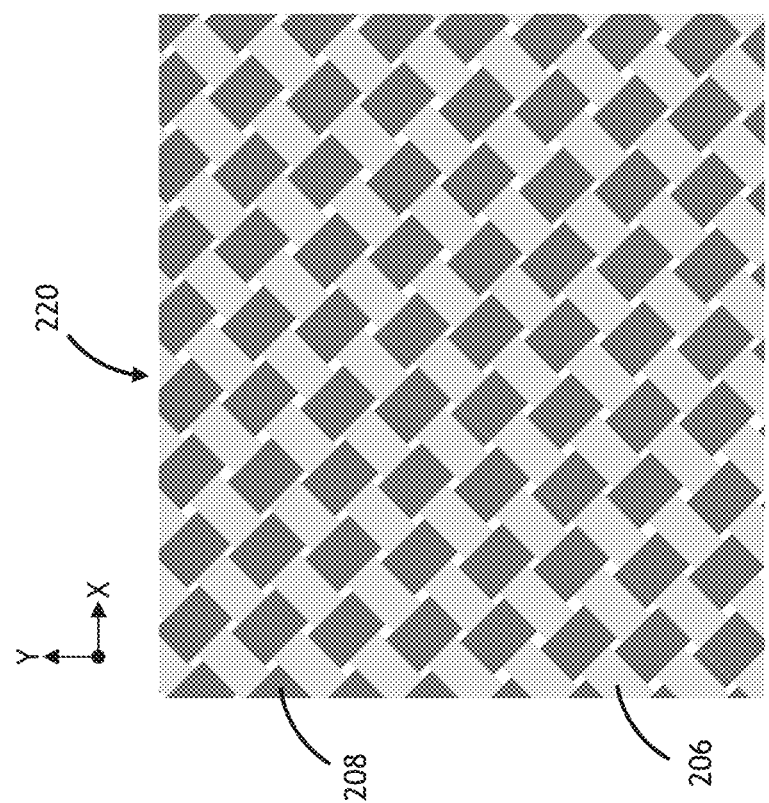
FIGS. 2A-2I are diagrams of parallel carbon fiber spread tow fabric (STF) face sheets with interwoven carbon fiber tape in accordance with an embodiment of the inventive concepts disclosed herein.
Figure 2A:
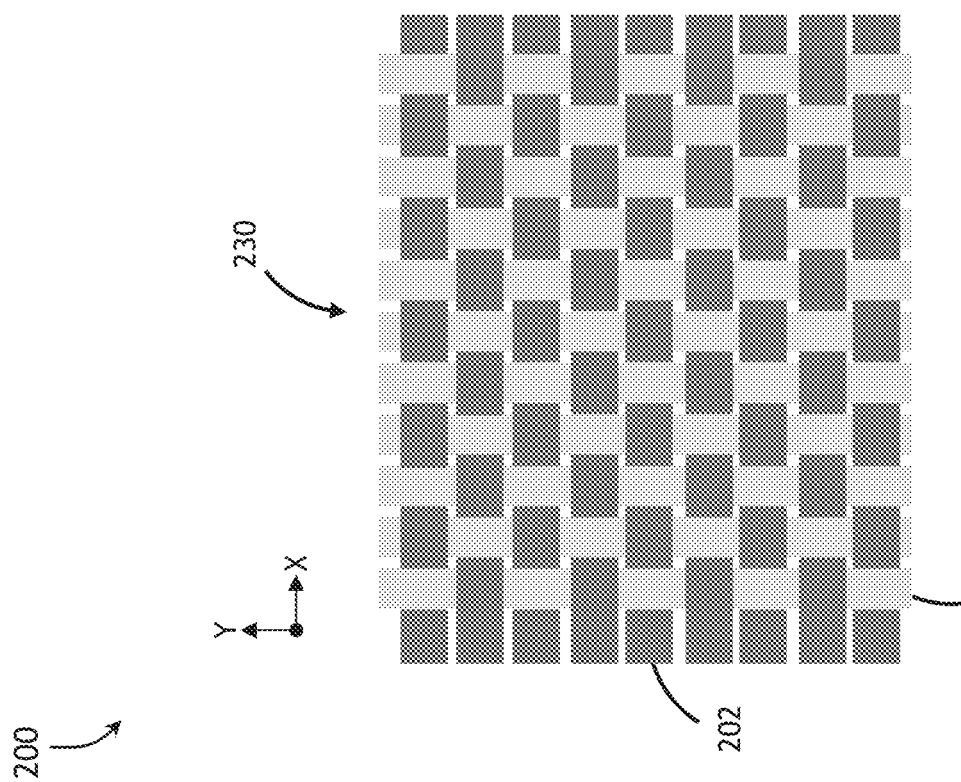
Figure 2C:
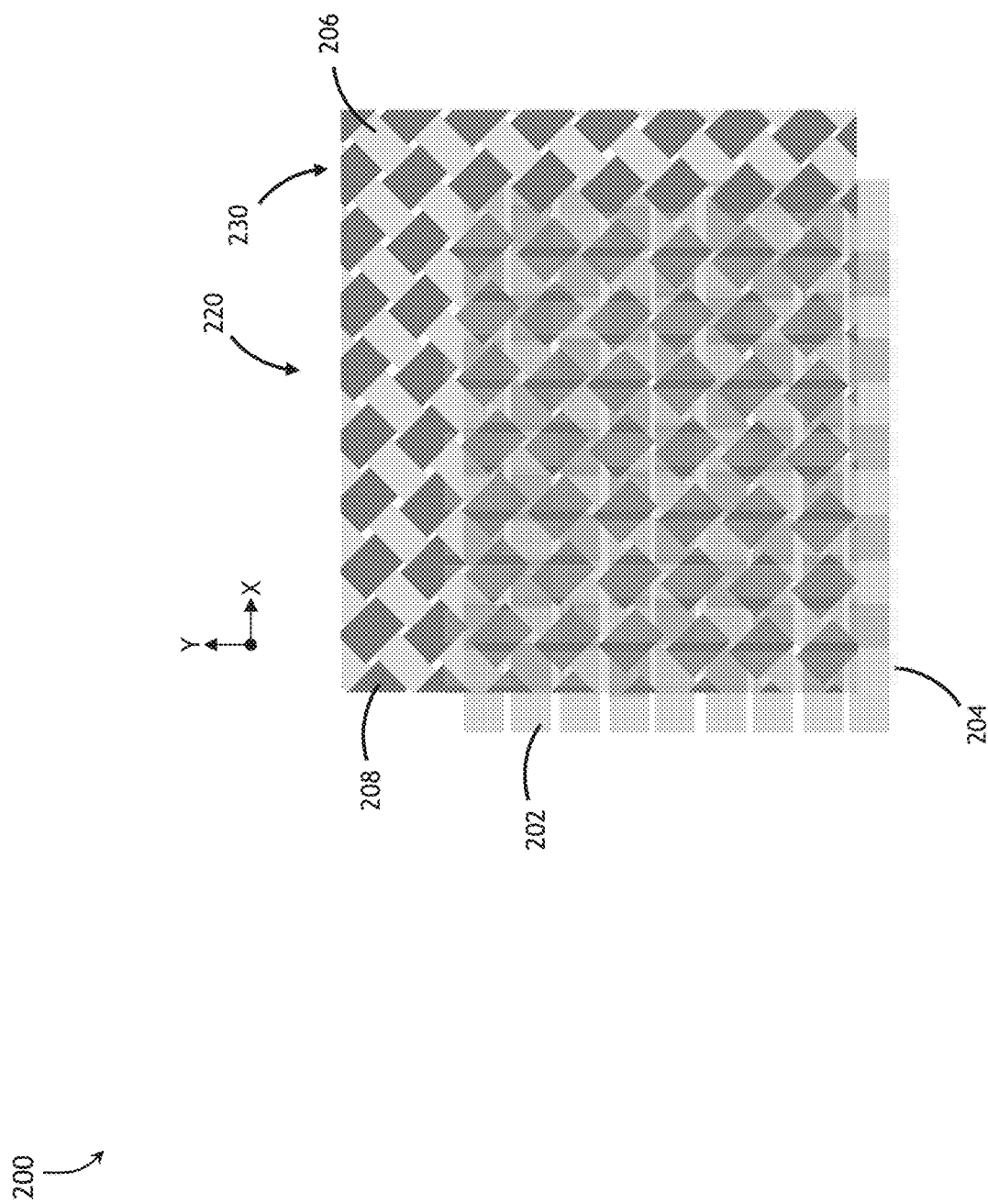

With specific reference now to FIGS. 2A-C, detail views of the composite panel structure 200 may be shown. The composite panel structure 200 may be comprised of layers of individual composite STF face sheets 220 230 comprised of a large number of unidirectional carbon fibers flattened to lie alongside each other to form a "tape" of between approximately 0.05 inches to 1.25 inches in width and approximately 0.0032 inches (0.080 mm) in thickness (height). The flat tapes may be interwoven in various patterns depending on a desired direction of strength. The interwoven tapes may be configured to produce a multi axial laminate with a high tensile strength and modulus in both X and Y directions.

As used herein, a carbon fiber "tow" or "tape" may be defined as a bundle of unidirectional carbon fiber filaments laid out parallel to each other in a flat configuration. The bundle may be unified by spraying a web of sacrificial adhesive binder over the surface.

To form a flat STF composite face sheet 220 230, and to prevent each tow from becoming separated during post manufacturing handling, the composite STF face sheets 220 230 may be treated with a powder or liquid sacrificial binder. Also, to increase specific properties of the STF, the carbon fiber STF face sheets 220 230 may be further molded with a second composite to create the composite panel structure, the second composite having a desired property, the desired property based on at least one of a desired strength, a desired impact resistance, a desired corrosion resistance, and a desired weight. For example, the second composite may include a layer functional to increase local impact resistance or as corrosion barrier for metals. Here an additional layer of glassfiber (e.g. "S" glass) may be added to the composite STF face sheets to comprise the composite panel structure 200. In some embodiments, the composite panel structure 200 may be protected by a separate 6 mm décor sheet which may be trimmed with a decorative film. If an operator may request, the S glass may form the outer face of the composite panel structure 200 for impact resistance.

One exemplary weave as shown in FIG. 2A may include woven tapes including a horizontal carbon fiber tape 202 and a vertical carbon fiber tape 204 oriented at approximately 90 degrees relative to each other. In this manner, the resulting composite 0/90 STF face sheet 230 may retain strength in each axis, but a greater strength in an axis parallel to the direction of each tape 202 204.

Another exemplary weave as shown in FIG. 2B may include tapes woven at an approximately 45-degree angle including an angled tape 206 and an opposite tape 208. Here, the final product 45/45 face sheet may possess strength in an axis parallel to each of the woven tapes 206 208. In this manner, a manufacturer may tailor the weave and angle of weave to a desired strength in a desired direction. Specifically, the manufacturer may weave the tape 206 208 in a desired direction for strength in a specific aircraft type and location of eventual monument placement.

The angles above may be exemplary only and a specific angle of weave may depend on a specific desired direction of strength. Contemplated herein, angles of weave may increase or decrease from the indicated angles without limitation. In embodiments, each of the STF face sheets 220 230 may be comprised of an 80 to 90 grams per square meter (gsm) T700 12K UD Spread Tow Fabric 0/90 or 45/45 weave, pre-impregnated at 40% optionally with AXIOM AX-5180-TXT epoxy resin (or equivalent). Each of the STF face sheets may be enhanced with an epoxy and/or phenolic resin which may be used either in pre-impregnation or as sheet adhesives added as interlayers between the different layers of the pre-pressed panels.

Another exemplary weave as shown in FIG. 2C may include a layered approach including each of the fabrics shown in FIGS. 2A and 2B. A combination of each weave comprising a molded 0/90 STF face sheet 230 to a 45/45 STF face sheet 220 to increase strength in a plurality of axes. In this manner, a manufacturer may increase strength of the composite panel structure 200 in a desired direction depending on a direction of weave and placement of the panel within the assembled aircraft monument 100. In one embodiment, the axes of a desired strength may include one of a longitudinal, a lateral, and a vertical axis of an aircraft.

In this manner, a layered and bonded woven fabric may retain strength properties in a plurality of desired directions. Thus, should a honeycomb panel be used as the inner core sheet 210, the STF face sheets 220 230 may reduce the impact of the ribbon core direction of the honeycomb cored panel by virtue of having multi-axial tensile strength characteristics. In one embodiment of the inventive concepts disclosed herein, each of the STF face sheets 220 230 may be comprised of an 0.16 pounds per square foot (80 grams per square meter (gsm)) carbon fiber fabric. The heavy STF face sheets may me more substantial in mass with an exemplary 0.32 pounds per square foot (160 gsm).

In one embodiment of the inventive concepts disclosed herein, the composite panel structure 200 may include an exemplary Kevlar, Twaron, E-glass and S-glass glass fiber, and additional forms of woven carbon fiber to manufacture laminate and cored structures and panels with different strength, impact/corrosion resistance, and weight properties and overall material cost.

In one embodiment of the inventive concepts disclosed herein, the thickness of the composite panel structure 200 may be approximately 0.394 inches (10 mm). In this manner, the overall assembled aircraft monument 100 may require a lesser footprint than a traditional aircraft monument construction.

In embodiments, the composite panel structure 200 may be significantly thinner in section and lighter than a conventional aerospace standard glass fiber composite reinforcement with the same strength characteristics. The composite panel structure 200 may possess a desirable thickness as compared to an Aerospace grade composite honeycomb cored panel of comparable strength. In one configuration, the composite panel structure 200 may be ⅓ of the thickness of a traditional cored panel of similar strength.

In one embodiment of the inventive concepts disclosed herein, the STF face sheets 202 204 may be pre-impregnated with resin and used in laminate and cored form to manufacture the composite panel structure 200 to create complex composite moldings that may be oven or autoclave cured.

The composite panel structure 200 may weigh significantly less than a traditional aircraft monument panel. In embodiments, the composite panel structure 200 may weigh approximately 972 grams per square meter or 3.43 ounces per square ft of area. The weight of the composite panel structure 200 may be approximately 0.25 of the weight of a traditional aerospace grade composite honeycomb cored panel of comparable strength.

Type 2

Figure 2D:
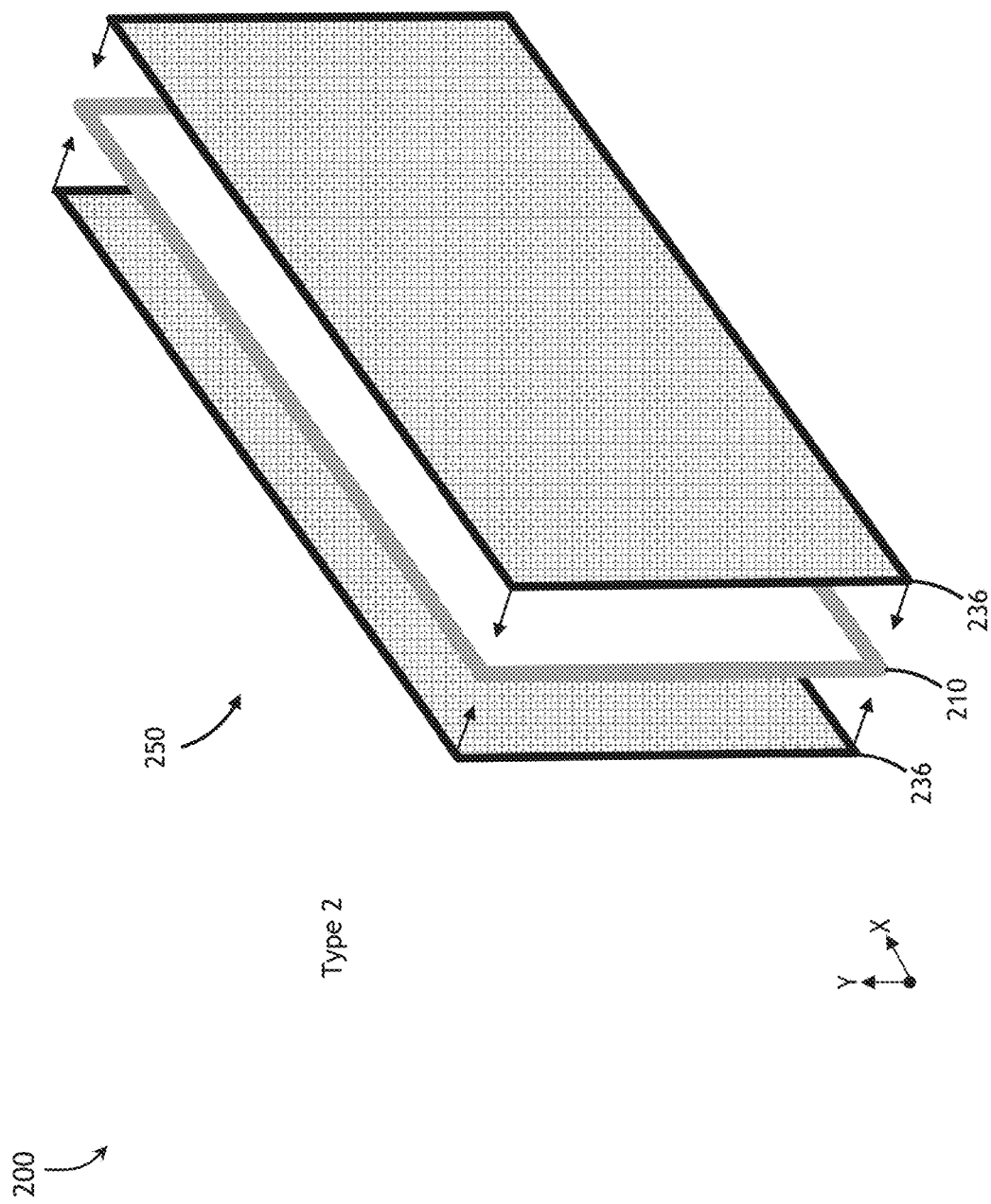

FIG. 2D may detail one embodiment of the inventive concepts disclosed herein. The composite panel structure 200 may include a plurality of parallel carbon fiber Spread Tow Fabric (STF) face sheets molded together to create the composite panel structure 200. The composite panel structure 200 may be comprised of a type two composite panel structure 250 in certain areas as well as a type one composite panel structure 252 in other areas. Depending on desired strength, the assembled aircraft monument 100 may use one or more types of the composite panel structure 200 to accomplish a strength goal.

The type two composite panel structure 250 may include two heavy STF face sheets 236 surrounding, and molded with, an inner core sheet 210. The type two composite panel structure 250 may be produced by the single outer heavy STF face sheets 236 surrounding the inner core sheet 210. Each of the surrounding heavy STF face sheets 236 may be comprised of a specific weave of the carbon fiber tape 202-208 to produce a desired strength. In embodiments, the heavy STF face sheets 236 may be comprised of a 160 to 180 gsm T700 12K UD Spread Tow Fabric 0/90 or 45/45 weave, pre-impregnated at 40% optionally with AXIOM AX-5180-TXT epoxy resin (or equivalent).

Each heavy STF face sheet 236 may then be fused to the core sheet 210 to form the type two 250 composite panel structure 200. While methods of fusing and molding the panels may differ, including cold molding and resin infused heated fusing, the final product of the composite panel structure 200 may retain multi-axial strength properties of each of the separate panels after the fusing is complete.

Type 1

Figure 2E:
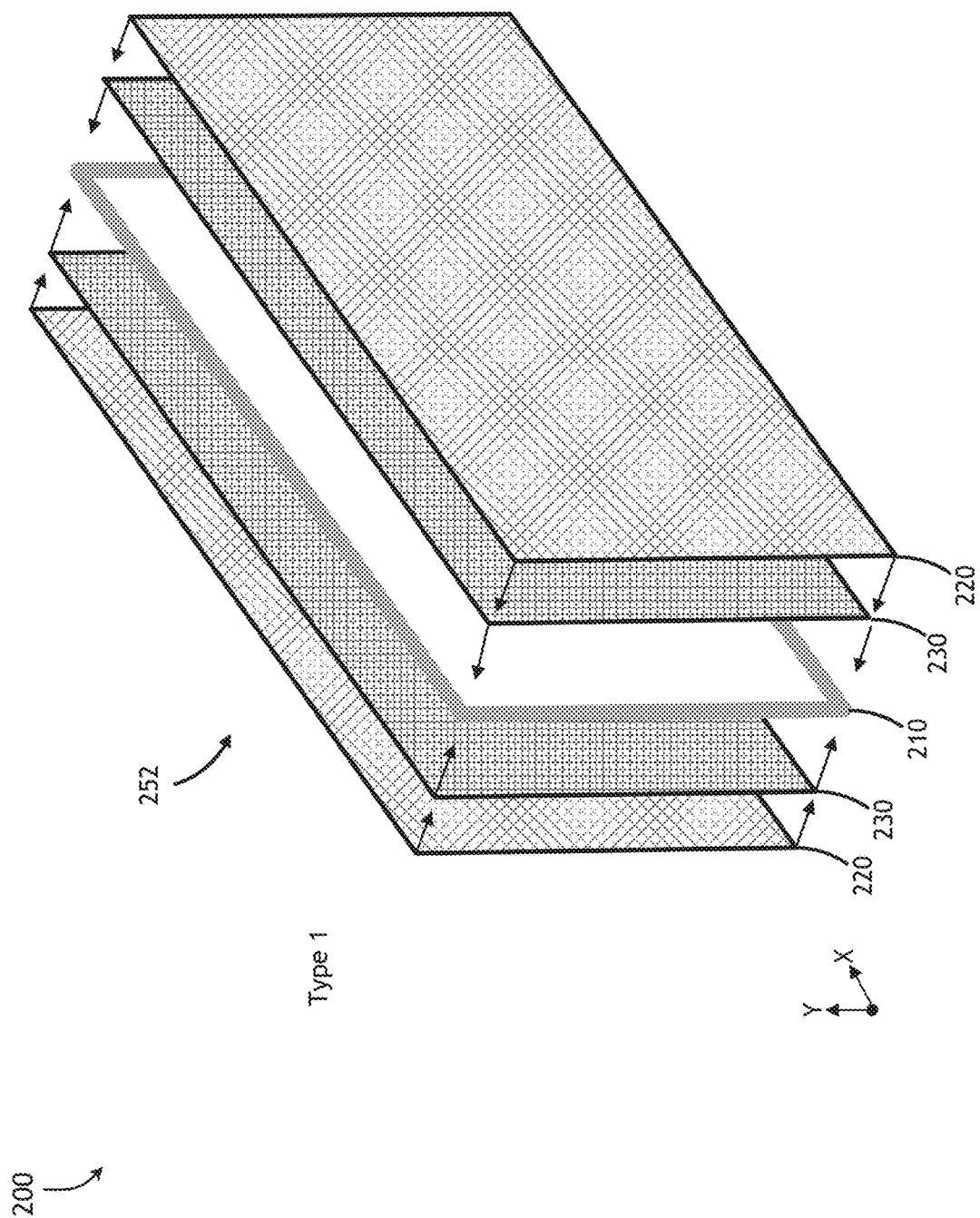

FIG. 2E may detail another exemplary embodiment of the inventive concepts disclosed herein. Here, a type one composite panel 252 may comprise the 45/45 STF face sheets 220 further surrounded and strengthened by a pair of 0/90 STF face sheets 230. In this manner, the type one 252 fused composite panel structure 200 may be further strengthened by additional weaves of the additional sheets. In one embodiment of the inventive concepts disclosed herein, the inner STF face sheets 220 maintain a weave of 45/45 while the first and second outer STF face sheets 230 maintain a weave of 0/90. Contemplated herein, each of the STF face sheets 220 230 may be altered in order relative to the inner core sheet 210 as well as molded in a plurality of directions relative to each other.

In each of the type one composite panel 252 and the type two composite panel 250, the inner core sheet 210 may be comprised of a plurality of composite material of desirable strength and suitable for molded construction with the STF face sheets 220 230. In embodiments, the inner core sheet 210 may comprise exemplary foam (non-structural) and honeycomb (structural) core structures able to be molded with the external STF face sheets 220 230. In one embodiment of the inventive concepts disclosed herein, the inner core sheet 210 may be comprised of a honeycomb core sheet of 0.381 inches (9.7 mm) thickness.

In embodiments, the STF face sheets 220 230 may be combined with fire resistant epoxy and/or phenolic (and additional) matrix systems to produce certifiable pre pressed panels for use in the manufacture of the assembled aircraft interior monument 100. When molded with an inner core sheet 206 comprised of a honeycomb structure, the STF face sheets 220 230 function to reduce the negative impact of the ribbon core direction strength limitation.

With the STF face sheets 220 230 molded, the composite panel structure 200 may possess similar biaxial tensile strength characteristics in both an x and a y direction. The composite panel structure 200 may be used in both a pre formed pressed panel process and for tooled composite moldings and may be combined with other types of Para and Meta Aramid reinforcements to provide specific strength, weight, durability and longevity characteristics.

Figures 2F, 2G:
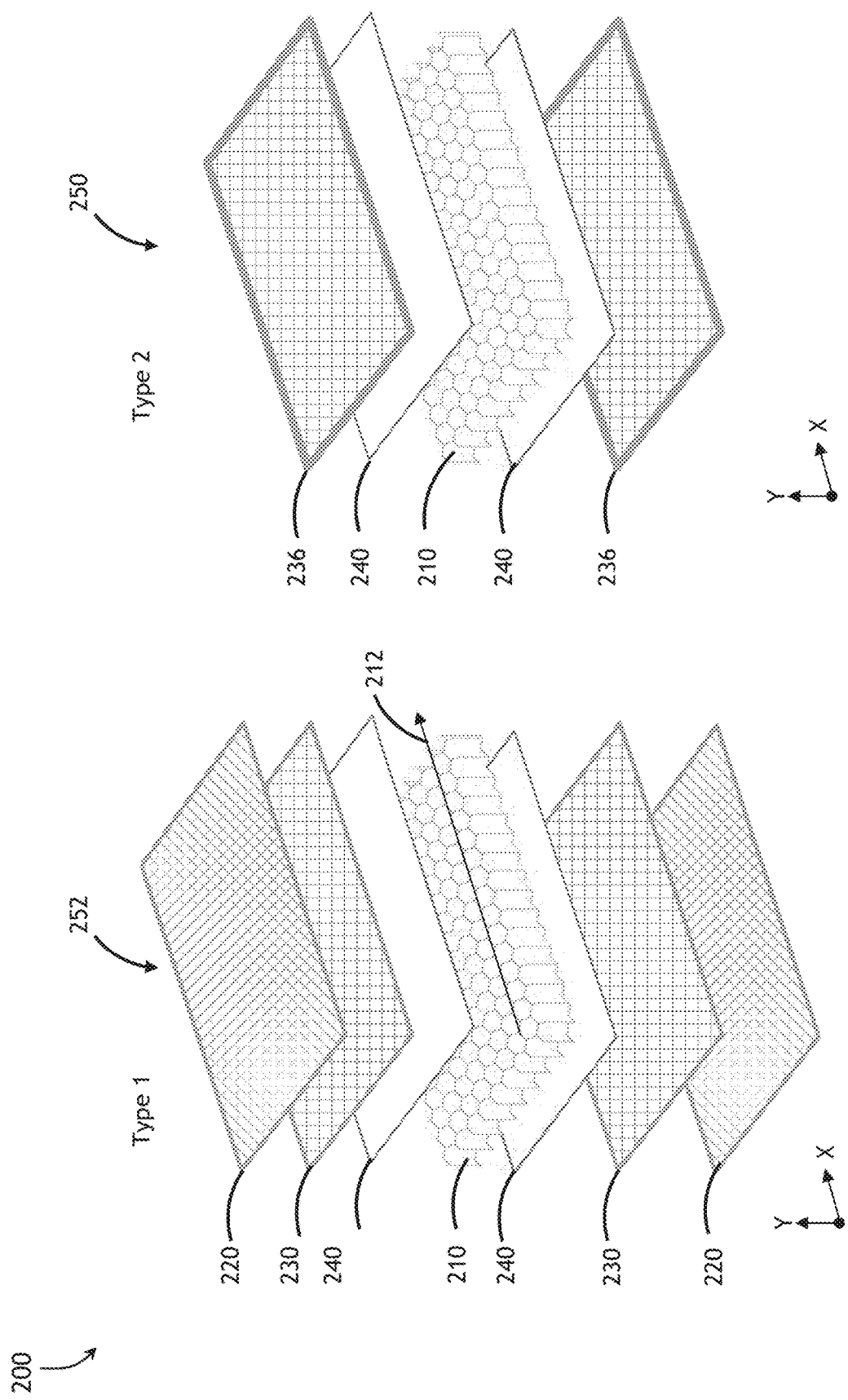

Referring to FIG. 2F and 2G, the inner core sheet 210 may comprise a plurality of inner core types including a hexagonal cell core sheet having a main ribbon direction 212. In some embodiments, the carbon fiber tapes 202 204 of a STF face sheet 230 are parallel 202 and at right angles 204 to the main ribbon direction 212 of the core. A second pair of STF face sheets 220 may include carbon fiber tapes 206 208 with the orientation of the STF carbon fibers at fibers at approximately 45 degrees to the main ribbon direction of the core. In embodiments, the inner core sheet 210 may be comprised of a 40 kilograms per cubic meter (1.8 mm paper) 3 mm Cell Kevlar honeycomb core or a 32 kilograms per cubic meter (1.5 mm paper) 3 mm Cell Kevlar honeycomb core.

Surrounding the inner core sheet 210 a layer of adhesive film 240 may function to adhere to the core sheet and offer a barrier between the individual elements of the inner core sheet 210 and the molded fabric STF face sheets 220 236. In embodiments, the adhesive film 240 may be comprised of a 50 gsm adhesive film layer or 15 gsm adhesion enhancer.

Figure 2H:
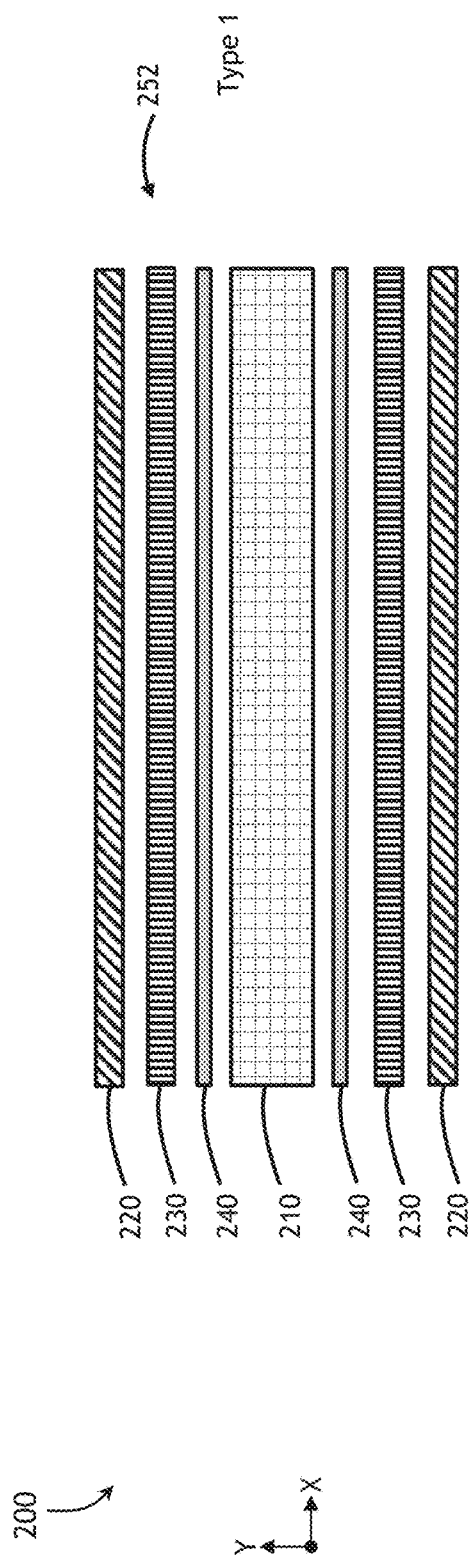
Figure 2I:
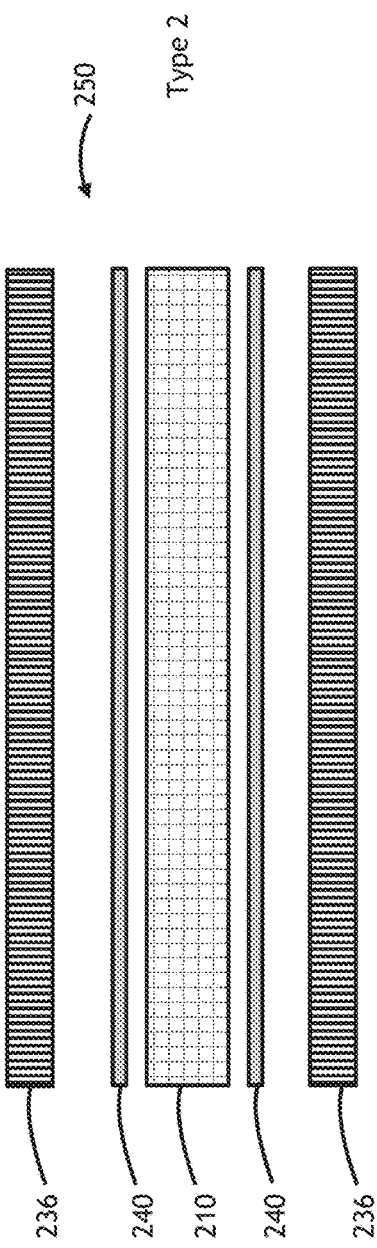

Referring to FIGS. 2H and 2I, examples of an exploded cross section of the composite panel structure 200 may be shown. Here, each layer may detail each of the type one 252 and type two 250 composite panels. In one embodiment, of the type one 252, the 0/90 STF face sheets 230 are molded nearest the core sheet 210. Those skilled in the art may recognize the order of face sheet installation may be reversed while falling directly within the scope of the inventive concepts herein. Once assembled (e.g., 4× STF face sheets with 40% epoxy resin impregnation, 2× epoxy adhesive sheets, and 1×10 mm Kevlar honeycomb core), each of the type one 252 and type two 250 composite panels may present a width of approximately 0.394 inches and a weight of approximately 3.43 ounces per square foot (846-1024 grams per square meter). Some embodiments may weigh considerably less (e.g. approximately 2.77 ounces per square foot).

In one example of placement determined strength, a mid cabin monument designed for a B777 aircraft oriented with a majority of panels in an x direction (e.g., a longitudinal axis of the aircraft). The manufacturer may desire strength of the weave to be primarily in the x and y direction to offer individual panel strength along a longitudinal and vertical axis of the aircraft.

The composite panel structure 200 may be implemented in both cored and monolithic structures and usable to construct hybrid commercial aircraft interior monuments. The hybrid monuments may comprise the composite panel structure 200 which may reduce the weight of a typical ship set of glass fiber panel construction monuments. In one exemplary embodiment, an aircraft ship set comprising the composite panel structure 200 may allow for a reduction in the overall weight of the interior structure by an exemplary 25 to 35% (1100 to 1800 lbs.) per a typical widebody aircraft (e.g., Boeing 777).

FIG. 3A-3E Lower Galley

Referring now to FIGS. 3A-3E, diagrams of an exemplary lower modular rectangular cuboid construction in accordance with an embodiment of the inventive concepts disclosed herein are shown. Views of a lower cuboid construction 300 may indicate detail of the lower galley assembly. The lower modular rectangular cuboid 110 may be constructed of individual panels which may join to create the lower galley assembly. Each panel of the lower modular rectangular cuboid 110 may be constructed of the composite panel structure 200.

A lower frame 120 may provide a molded structure to which each of the additional lower panels may join. In one embodiment, the lower frame 120 and the lower back panel 116 are formed of a single piece of the composite panel structure 200 including preformed slots into which the additional panels may fit. The lower frame 120 may comprise the lower back panel 116 and a rectangular frame encircling an area sized to receive the lower top panel 118. In this manner, the single piece of composite panel structure creating the lower frame 120 may accommodate various types of lower top panels 118.

Depending in part on a direction of weave of the individual tapes 202-208 each panel may add to the strength of the cuboid as a whole. In one embodiment, a weave of 0/90 degrees may lead to a cuboid having great biaxial tensile strength in both X and Y directions. Further, depending in part upon the variety of panels available to the cuboid structure, the lower modular rectangular cuboid 110 may possess additional strength through additionally installed panels. As best show in FIG. 3D, bonded installation of additional lower cart dividers 122 may add to the overall strength of the lower modular rectangular cuboid 110.

Chilled Galley

In one embodiment of the inventive concepts disclosed herein, the assembled aircraft monument 100 may function as a chilled and/or heated galley while in another embodiment, the galley may remain unconditioned. FIG. 3C may indicate additional structure enabling the lower modular rectangular cuboid 110 to channel conditioned air to and from a cuboid interior storage. A lower top air pathway 320 may function to channel conditioned air from the lower back panel and distribute the conditioned air to the interior storage. The lower top air pathway 320 may be attached to the lower top panel 118 or pre molded as a single structure with the lower top panel 118.

To circulate the conditioned air once flowing through the interior storage, the lower modular rectangular cuboid 110 may include a lower back air pathway 322 configured to return the used air from the interior storage to the aircraft system for re-conditioning. The lower back air pathway may be bonded with the lower back panel 116 or affixed via vacuum forming to the lower back panel 116. In embodiments, each air pathway may be separate molded in composite laminate structures that may be integral to or separately bonded to the panels.

Non-Chilled Galley

In one embodiment of the inventive concepts disclosed herein, the lower modular rectangular cuboid 110 may be constructed without the pathways required for a chilled galley. In this manner, the overall weight and footprint of the lower modular rectangular cuboid 110 may be reduced should an operator desire a non-conditioned galley. Here, without each of the lower top air pathway 320 and the lower back air pathway 322, the lower top panel 118 may be flat and the operator may realize increased available space in the interior storage as well as a lesser overall weight than that of the chilled galley option.

Figure 3D:
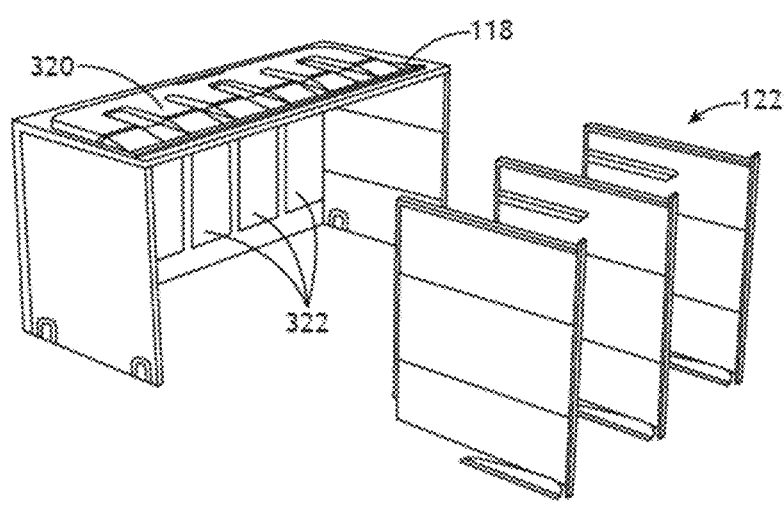
Figure 3E:
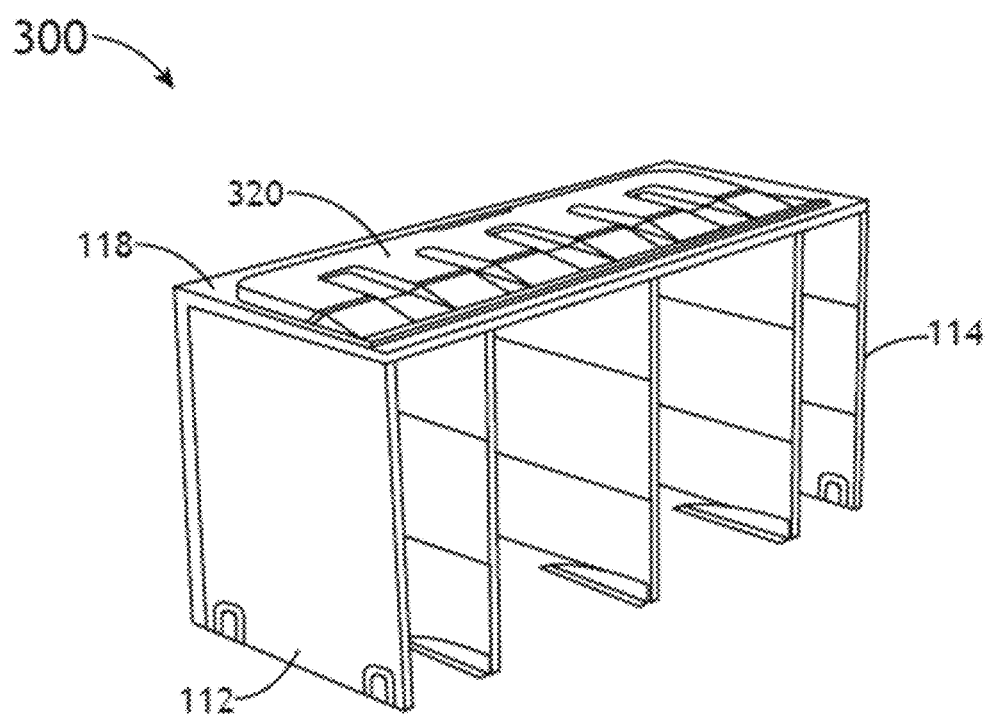

FIG. 3E may detail a view of an assembled lower modular rectangular cuboid 110 with the chilled galley optional lower top air pathways 320 coupled with the lower top panel 118.

FIG. 4A-4L Upper Galley

Figure 4A:
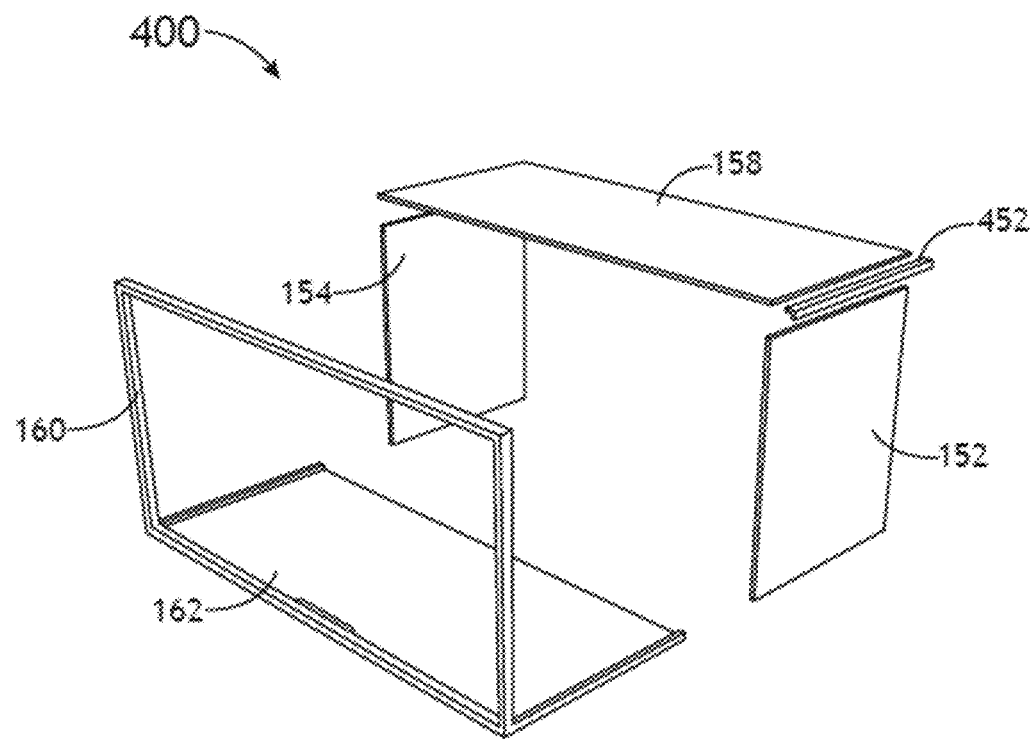
FIGS. 4A-4L are diagrams of an exemplary upper modular rectangular cuboid construction in accordance with an embodiment of the inventive concepts disclosed herein.

Referring now to FIGS. 4A-4L, diagrams of an exemplary upper modular rectangular cuboid construction in accordance with an embodiment of the inventive concepts disclosed herein are shown. An upper cuboid construction 400 may detail elements joined together to create the upper modular rectangular cuboid 150. FIG. 4A may indicate each of the upper left side panel 152, the upper right side panel 154, the upper to panel 158 as well as the upper base panel 162, each of the panels constructed of the composite panel structure 200.

In one embodiment of the inventive concepts disclosed herein, an upper frame 160 may be configured to receive the upper back panel 156. Also, the upper frame 160 and the upper back panel 162, and a series of upper air channels including an air supply duct 410 and an air return duct 420 may be molded of a single piece of the composite panel structure 200.

An edge joint 452 may function to receive an edge of each of one of the side panels 152 154 and top panel 158 to join the sides to the top. The upper frame 160 may receive the combined sides and top panels to complete the upper modular rectangular cuboid 150.

Figure 4B:
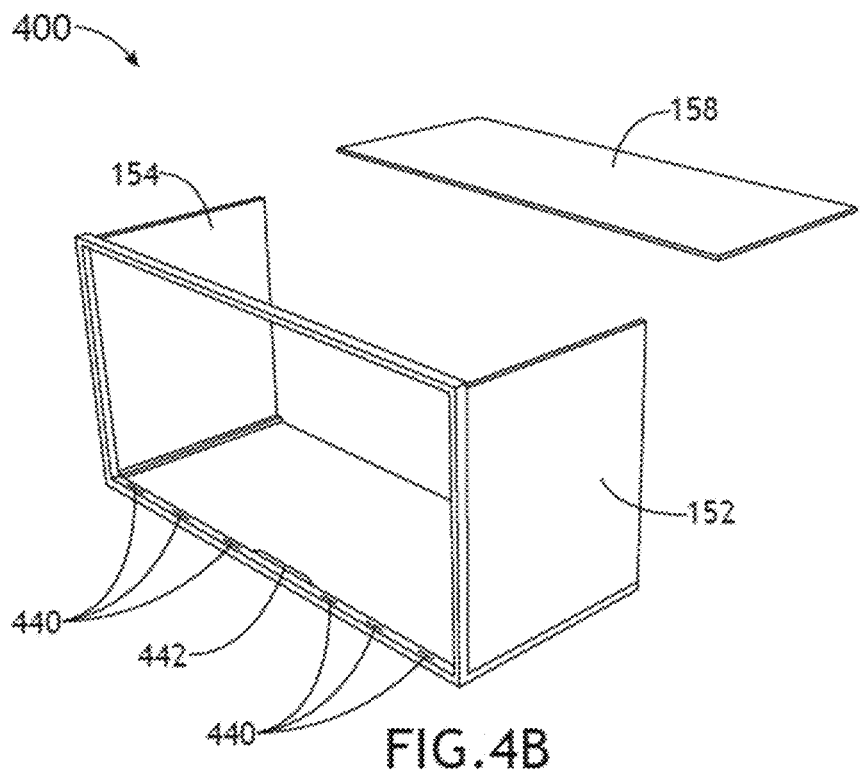

FIG. 4B may indicate a series of air return ports 440 as well as an air supply port 442. These ports may mate with additional air duct work and plenums to ensure an efficient flow of conditioned air in the case of the chilled galley. The upper back panel 156 may also be configured with air movement structure for efficient conditioned air movement.

Figure 4C:
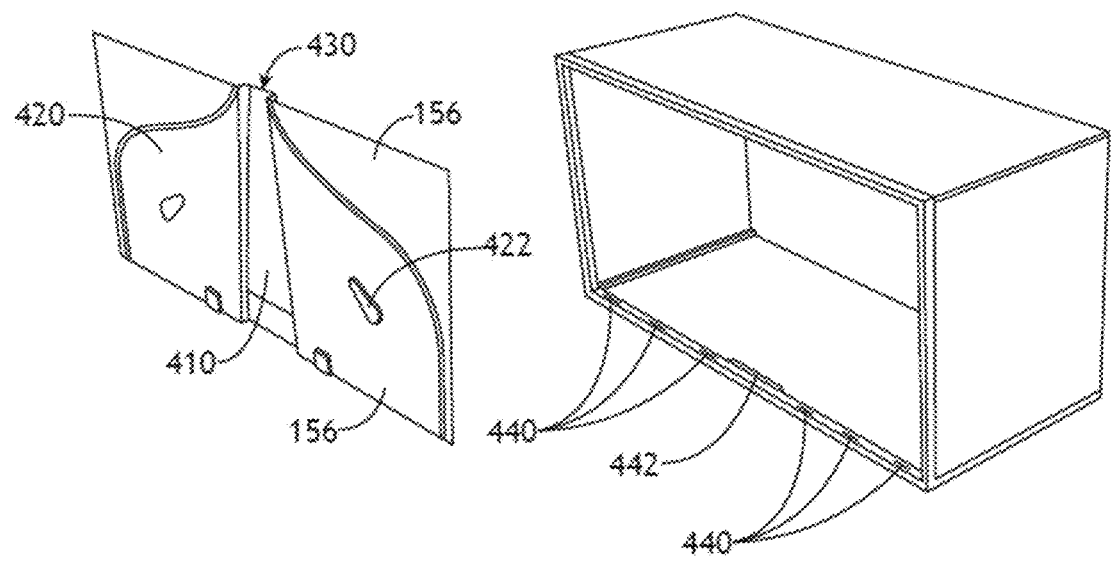
Figure 4D:
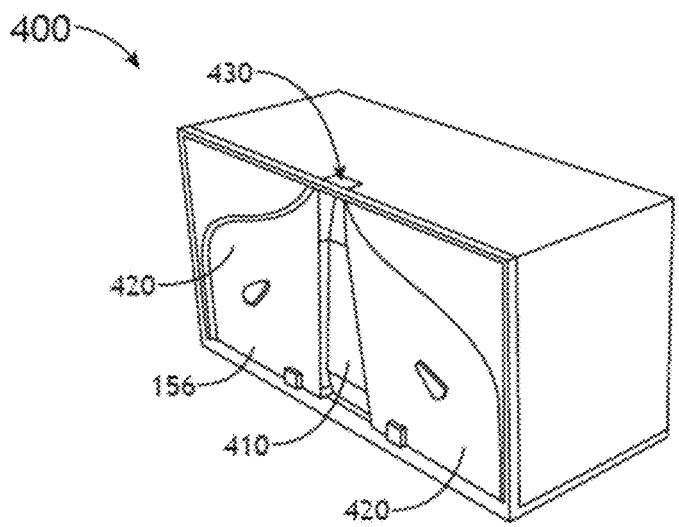

FIG. 4C may indicate an air supply duct 410 functional to channel conditioned air from above to the lower modular rectangular cuboid 110. A Siamese air port 430 proximal with the top of the upper back panel 156 may function to mate with a conditioned air supply and return associated with an aircraft conditioned air network. An air return duct 420 within the upper back panel 156 may function to channel return air from the lower galley structure to a return side of the Siamese air port 430. Within the air return duct 420, a pair of anti-resonance islands 422 may function to reduce flex within the upper back panel 156 as well as reducing vibration within the air return duct 420. FIG. 4D may detail the upper back panel 156 affixed to the upper modular rectangular cuboid 150.

Figure 4E:
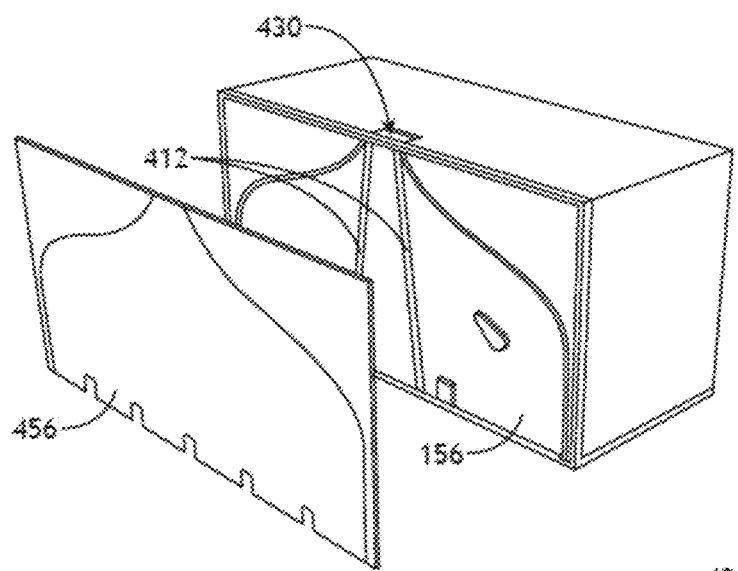

FIG. 4E may detail an upper close out panel 456 constructed of the composite panel structure 200. The upper close out panel 456 may join with the upper back panel 156 to enclose each pathway for efficient conditioned air movement. As the upper close out panel 456 joins, it may mate with a pair of insulated air dividers 412 to separate the supply air in the air supply duct 410 from the return air within the air return duct 420.

Figure 4F:
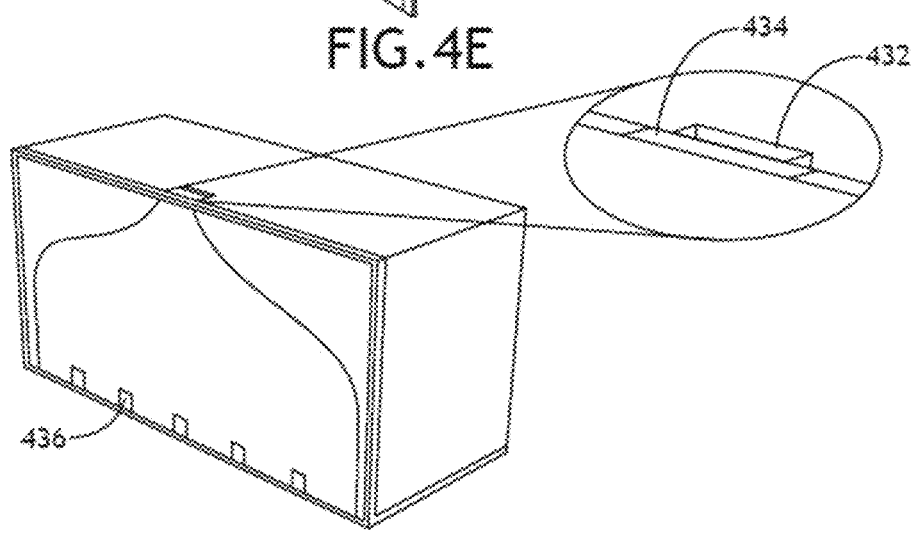
Figure 4G:
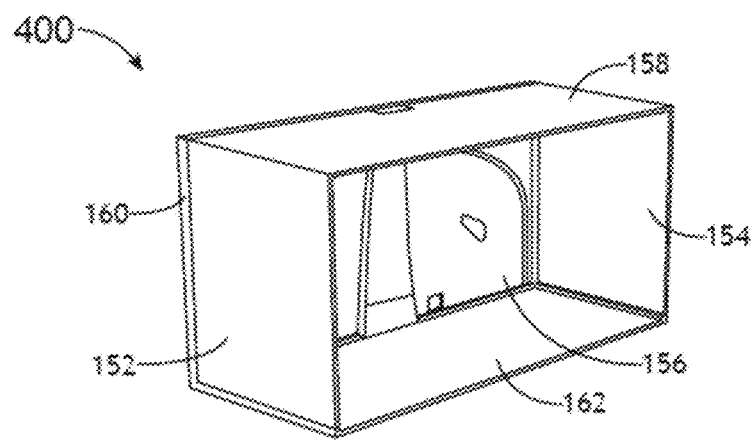
Figure 4H:
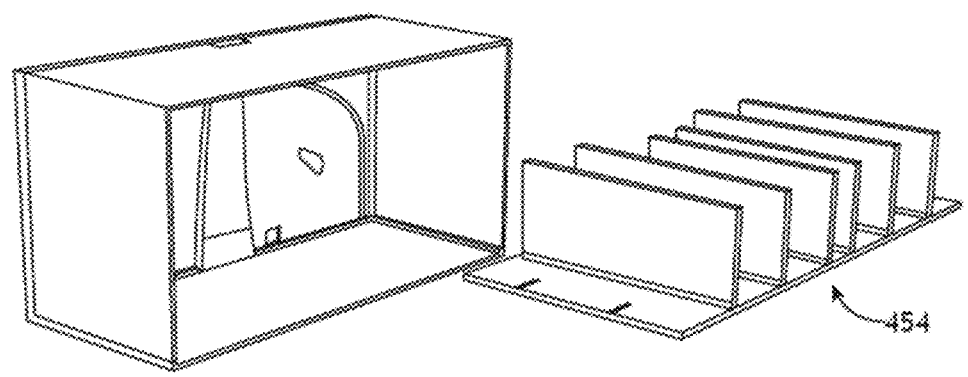
Figure 4I:
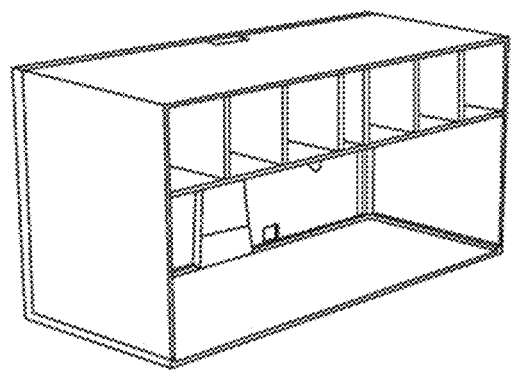
Figure 4J:
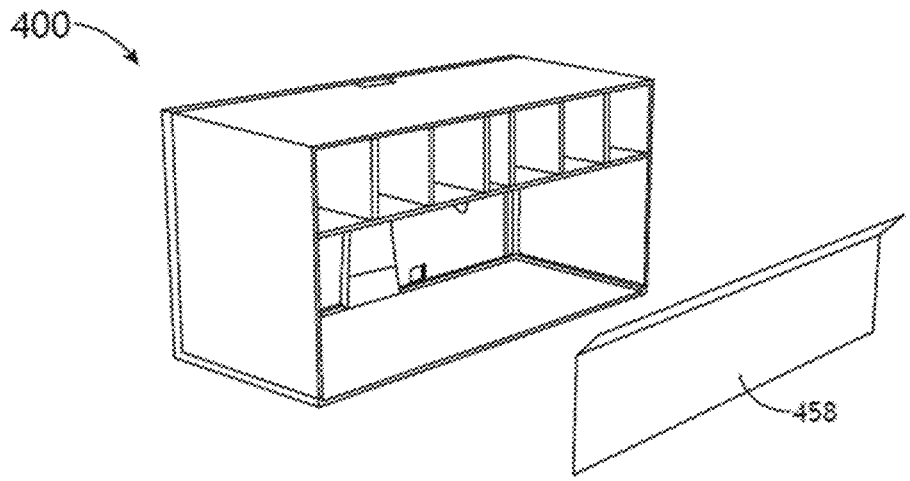
Figure 4K:
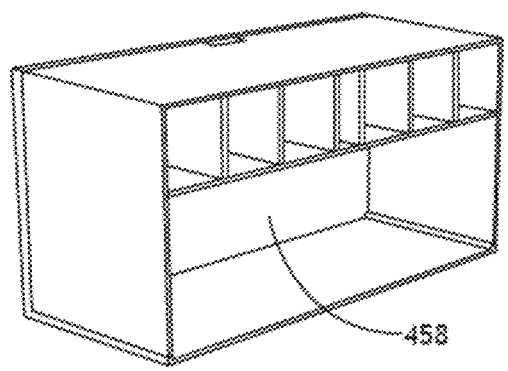
Figure 4L:
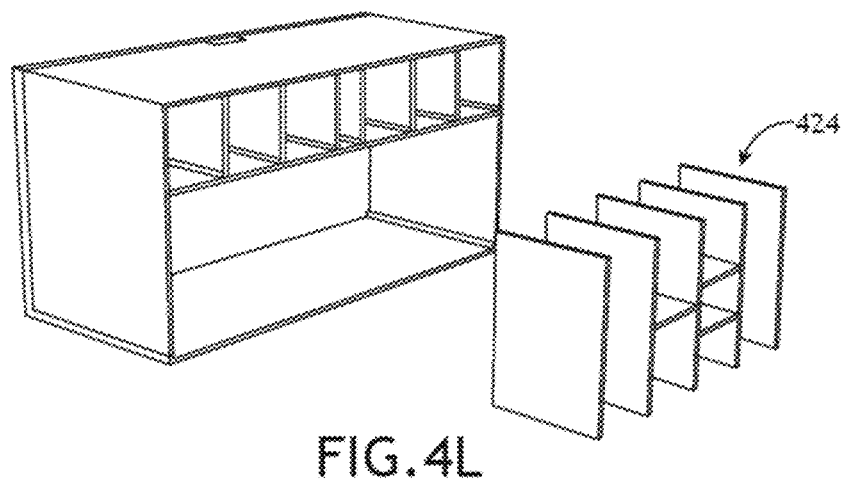

FIG. 4F may indicate additional structure within the upper close out panel 456. A series of mechanical connection points 436 may offer the assembled aircraft monument 100 an available connection to aircraft systems for Above Work Deck (AWD) Below Work Deck (BWD) elements. For example, an electrical source from the aircraft electrical system may connect with an AWD coffee maker in the upper modular rectangular cuboid 150 via one or more of the mechanical connection points 436.

FIG. 4F may detail the Siamese air port 430 including a Siamese supply port 432 and a Siamese return port 434. In this manner, the upper modular rectangular cuboid 150 may provide a single Siamese air port 430 minimizing area required for both supply conditioned air and return air.

A comparison of FIGS. 4F, 4C and 3D may detail how conditioned air may flow through each of the upper modular rectangular cuboid 150 and the lower modular rectangular cuboid 110. In an exemplary chilled galley configuration, cold aircraft air may be channeled into the upper modular rectangular cuboid 150 via the Siamese supply port 432 and be channeled down the air supply duct 410 to the lower top air pathways 320. From the lower top air pathways, the assembled aircraft monument 100 may port the conditioned air into the lower modular rectangular cuboid 110 and be circulated around the products stored within the lower modular rectangular cuboid 110.

The assembled aircraft monument 100 may draw return air into each of the lower back air pathway 322 and drawn into the air return duct 420 and then ported to the Siamese return port 434 for return to the aircraft supply for re-conditioning.

An upper divider 454 may be configured to mount within the upper modular rectangular cuboid 150 enabling efficient use of the available space. In one embodiment, the upper divider 454 are also constructed of the composite panel structure 200. A services panel 458 may join within the upper modular rectangular cuboid 150 proximal with an interior of the upper back panel 156 and functional to conceal mechanical services (e.g., electrics, plumbing, gas, etc.) as well as any insulation surrounding the conditioned air ducting. A variable galley insert 424 may be configured to join the upper modular rectangular cuboid 150 and function to organize the space for efficient operation.

FIG. 5 Assembly

Figure 5:
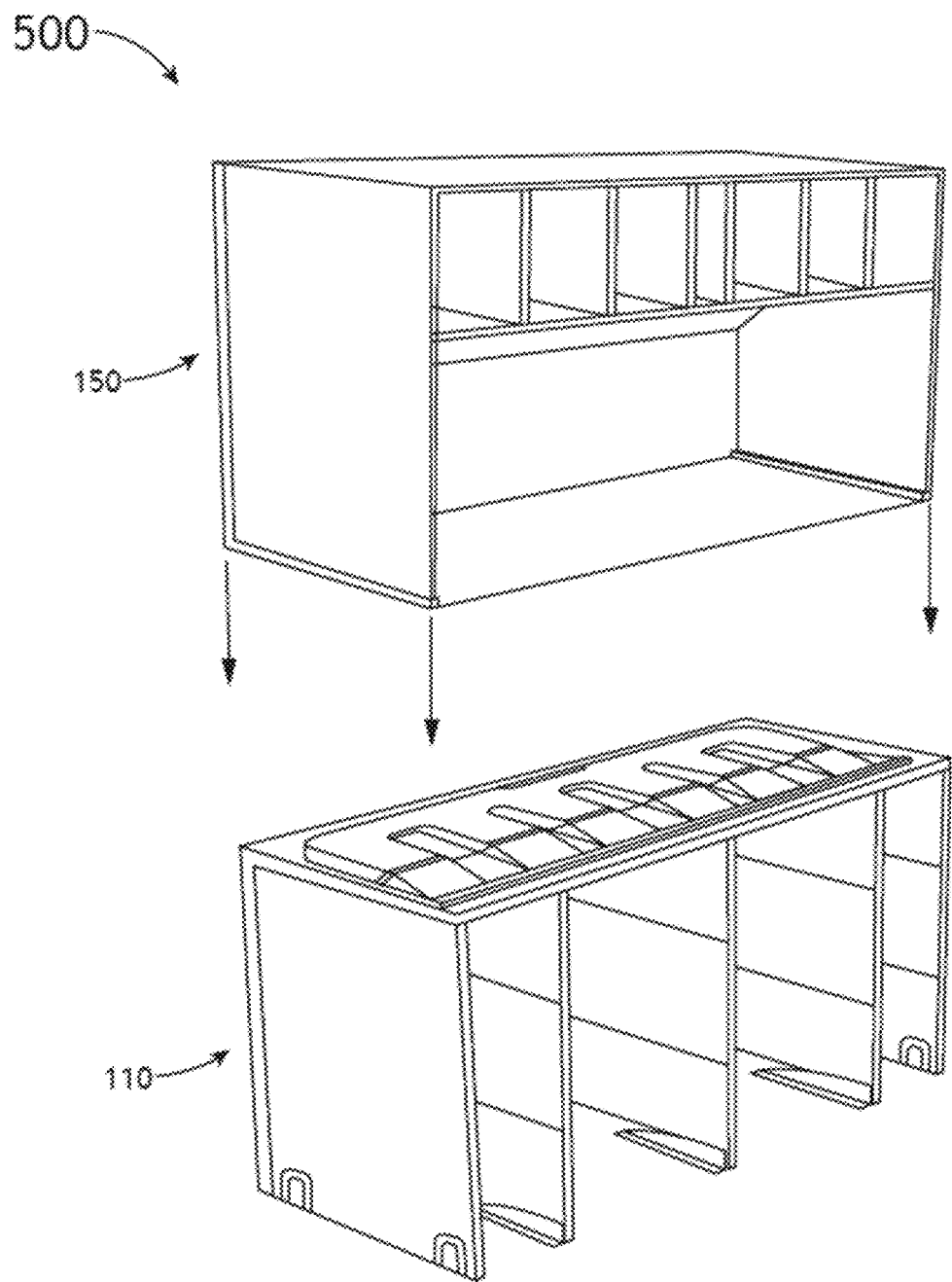
FIG. 5 is a diagram of an aircraft galley prior to assembly in accordance with one embodiment of the inventive concepts disclosed herein.

Referring now to FIG. 5, a diagram of an aircraft galley prior to assembly in accordance with one embodiment of the inventive concepts disclosed herein is shown. Prior to assembly 500 each of the lower 110 and upper 150 modular rectangular cuboids may be shown ready for assembly. Here, the lower modular rectangular cuboid 110 is configured for a chilled galley structure offering the ductwork for conditioned air distribution. Contemplated herein, each of the upper 150 and lower 110 modular rectangular cuboids may be of modular construction offering a capability for each to couple to another of each. For example, a particular operator may prefer three sets of upper and lower cuboids coupled together for a specific galley structure. Here, the upper modular rectangular cuboid 150 may couple with both the lower modular rectangular cuboid 110 as well as an upper modular rectangular cuboid on either side. In this manner, an operator may be flexible in modular galley configuration.

FIG. 6 Method

Figure 6:
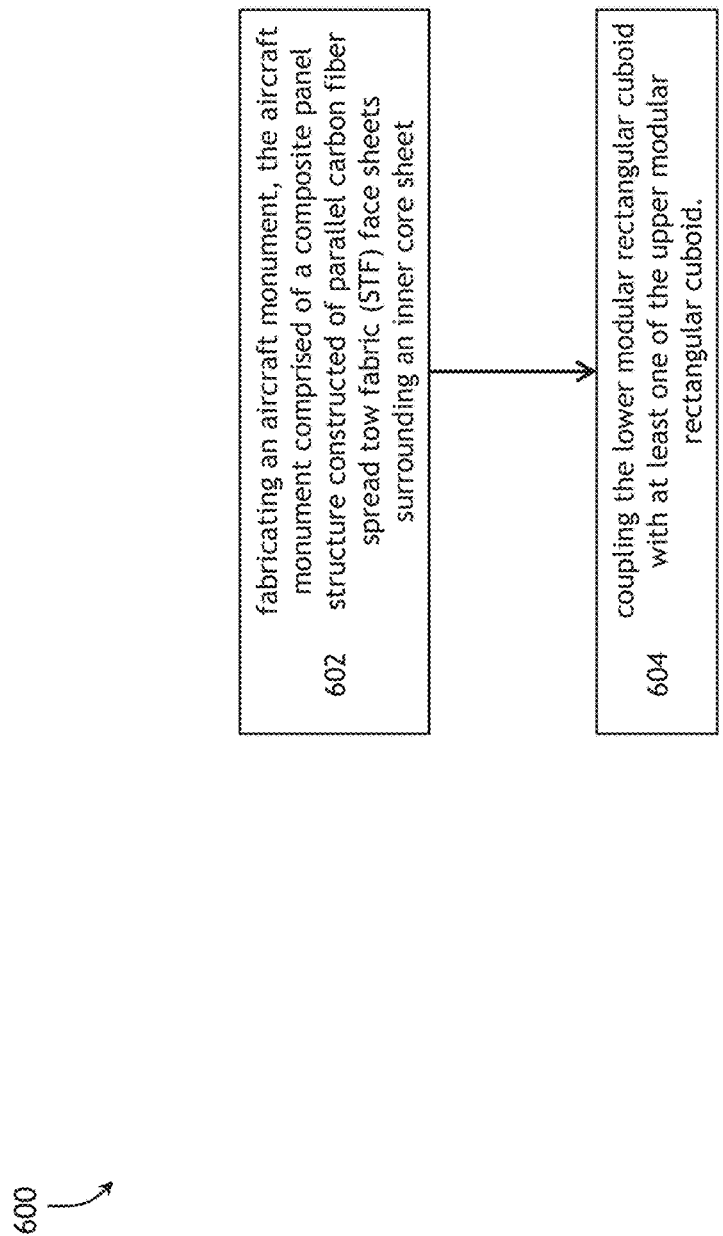
FIG. 6 is a diagram of an exemplary method for aircraft monument construction in accordance with one embodiment of the inventive concepts disclosed herein.

Referring now to FIG. 6, a diagram of an exemplary method for aircraft monument construction in accordance with one embodiment of the inventive concepts disclosed herein is shown. A method for aircraft monument construction 600 may include, at a step 602, fabricating an aircraft monument, the aircraft monument comprised of a composite panel structure constructed of parallel carbon fiber spread tow fabric (STF) face sheets surrounding an inner core sheet. At a step 604, the method may include coupling the lower modular rectangular cuboid with at least one of the upper modular rectangular cuboid.

Conclusion

As will be appreciated from the above description, embodiments of the inventive concepts disclosed herein may provide a novel commercial aircraft interior monument encompassing carbon unidirectional spread flat tow woven fabric.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A composite aircraft cabin monument construction, comprising: a lower modular rectangular cuboid comprising a lower left side panel, the lower left side panel constructed of a composite panel structure, the composite panel structure constructed of at least two parallel carbon fiber spread tow fabric (STF) face sheets on each side of and surrounding an inner core sheet, the at least two parallel carbon fiber STF face sheets comprises 1) an inner STF face sheet having a weave of individual tapes woven with a first tape at 0 degrees and a second tape at 90 degrees relative to a main ribbon direction of the inner core sheet molded with 2) an outer STF face sheet having a weave of individual tapes woven with a third tape at 45 degrees and a fourth tape at 135 degrees relative to the main ribbon direction of the inner core sheet;

wherein the inner core sheet comprises one of a hexagonal cell honeycomb core, a honeycomb core, and a foam core;

the lower modular rectangular cuboid further comprising a lower right side panel, a lower back panel, and a lower top panel, each of the lower right side, back and top panels constructed of the composite panel structure;

the lower modular rectangular cuboid further comprising a lower frame encircling one of the lower back panel and the lower top panel, the lower frame configured for joining each of the lower left and lower right side panels to one of the lower back and the lower top panels;

an upper modular rectangular cuboid comprising an upper left side panel, an upper right side panel, an upper base panel, an upper back panel, and an upper top panel, each panel of the upper modular rectangular cuboid constructed of the composite panel structure;

the upper modular rectangular cuboid including an upper frame encircling one of the upper base panel and the upper back panel, the upper frame configured for joining each of the upper left and upper right side panels to one of the upper back and the upper base panels;

the upper modular rectangular cuboid configured to couple with the lower modular rectangular cuboid, the base of the upper modular rectangular cuboid coupling with the top of the lower modular rectangular cuboid.

2. The composite aircraft cabin monument construction of claim 1, wherein the at least two parallel carbon fiber STF face sheets further comprise a fabric of interwoven carbon fiber tape, the carbon fiber tape interwoven at one of: approximately 90 degrees and approximately 45 degrees.

3. The composite aircraft cabin monument construction of claim 2, wherein the carbon fiber tape is further comprised of a plurality of flattened unidirectional carbon fibers aligned proximally parallel with each other, the carbon fiber tape having a width of between approximately 0.5 inches to approximately 1.25 inches and a depth of approximately 0.0032 inches.

4. The composite aircraft cabin monument construction of claim 2, wherein the fabric of interwoven carbon fiber tape is further treated with a sacrificial binder functional to adhere each carbon fiber tape to another of the carbon fiber tape.

5. The composite aircraft cabin monument construction of claim 2, wherein the carbon fiber tape is interwoven at a specific angle to enable one of a desired tensile strength and a desired compression strength, each of the desired tensile and compression strength based on an aircraft cabin monument placement.

6. The composite aircraft cabin monument construction of claim 2, wherein the fabric of interwoven carbon fiber tape is further configured in layers of the carbon fiber STF face sheets, a first layer having the carbon fiber tape interwoven at a first angle and a second layer having the carbon fiber tape interwoven at a second angle creating a multi-axial laminate with an elastic modulus defined by a plurality of axes.

7. The composite aircraft cabin monument construction of claim 6, wherein the first angle is approximately 90 degrees to a core ribbon and the second angle is approximately 45 degrees to the core ribbon, and the axes include one of the longitudinal, a lateral, and the vertical axis of the aircraft.

8. The composite aircraft cabin monument construction of claim 1, wherein one of the lower top panel and lower back panel are configured with at least one pathway configured for a transfer of one of a conditioned airflow and a return airflow.

9. The composite aircraft cabin monument construction of claim 8, wherein the upper frame, the upper back panel, and the at least one pathway are molded as a single piece of the composite panel structure.

10. The composite aircraft cabin monument construction of claim 8, wherein the lower frame and the lower back panel are molded of a single piece of the composite panel structure.

11. The composite aircraft cabin monument construction of claim 1, wherein the upper back panel is further configured with at least one pathway configured for a transfer of one of a conditioned airflow and a return airflow.

12. The composite aircraft cabin monument construction of claim 1, wherein the composite panel structure maintains a width of approximately 0.394 inches and a weight of approximately 3.43 ounces per square foot.

13. The composite aircraft cabin monument construction of claim 1, wherein the STF is further configured with one of a fire resistant epoxy, a resin, and a phenolic.

14. The composite aircraft cabin monument construction of claim 1, wherein the carbon fiber STF is further configured with a second composite to create the composite panel structure, the second composite having a desired property, the desired property based on at least one of a desired strength, a desired impact resistance, a desired corrosion resistance, and a desired weight.

\* \* \* \* \*